(12) United States Patent
Kelly et al.

(10) Patent No.: US 7,755,808 B2
(45) Date of Patent: Jul. 13, 2010

(54) DOCUMENT SCANNER DUST DETECTION SYSTEMS AND METHODS

(75) Inventors: Nancy Kelly, Rochester, NY (US); Biruk Gossaye, Rochester, NY (US)

(73) Assignee: Xerox Corporation, Norwalk, CT (US)

( * ) Notice: Subject to any disclaimer, the term of this patent is extended or adjusted under 35 U.S.C. 154(b) by 1138 days.

(21) Appl. No.: 11/281,576

(22) Filed: Nov. 17, 2005

(65) Prior Publication Data

US 2007/0109511 A1 May 17, 2007

(51) Int. Cl.
  *H04N 1/024* (2006.01)
(52) U.S. Cl. ...................... 358/474; 358/488
(58) Field of Classification Search ........... 358/464, 358/1.13; 382/254, 274, 464
  See application file for complete search history.

(56) References Cited

U.S. PATENT DOCUMENTS

| | | | |
|---|---|---|---|
| 5,339,139 A | | 8/1994 | Fullerton et al. |
| 5,748,293 A | | 5/1998 | Crawford et al. |
| 6,032,004 A | | 2/2000 | Mirabella, Jr. et al. |
| 6,593,995 B1 | | 7/2003 | Hogestyn |
| 6,845,288 B2 * | | 1/2005 | Pierel et al. .......... 700/194 |
| 2002/0071135 A1 * | | 6/2002 | Takeda et al. .......... 358/1.14 |
| 2004/0071362 A1 | | 4/2004 | Curry et al. |
| 2004/0212853 A1 | | 10/2004 | Kelly et al. |
| 2005/0146756 A1 | | 7/2005 | Shimizu |

* cited by examiner

*Primary Examiner*—Benny Q Tieu
*Assistant Examiner*—Ngon Nguyen
(74) *Attorney, Agent, or Firm*—Gibb I.P. Law Firm, LLC

(57) ABSTRACT

Embodiments herein begin by sensing first document presence data of a media sheet in a media path using a scanner. Then, the embodiments calculate a background correction factor for scanning the media sheet based on input from the scanner. Second document presence data is obtained from this background correction factor. If the second document presence data indicates that no media sheet is present (which is contrary to the first document presence data), there is a possibility that the first document presence data was false. In order to check if the first document presence data is false, the embodiments obtain third document presence data relating to alignment of the media sheet within the media path, again using the scanner. If the third document presence data also determines that no media sheet is present, this indicates that the media path is in need of cleaning. In other words, if the first document presence data indicates that the media sheet is present, but the second document presence data and third document presence data both indicate that no media sheet is present, the embodiments provides a notification that the media path needs cleaning.

18 Claims, 3 Drawing Sheets

DOCUMENT SCANNER DUST DETECTION SYSTEMS AND METHODS

BACKGROUND

Embodiments herein generally relate to systems and methods for detecting dust in the paper path of scanners, copiers, multi-function devices, etc. Over time in the scanning system, paper dust can accumulate in the path. Dust accumulated at the image capture location can cause image quality problems as well as misdetections of electronic registration and automatic exposure systems.

SUMMARY

Dust accumulated in the scan path can cause misdetections in electronic image registration and automatic exposure failures. The embodiments herein use the failures themselves, when combined with other data captured from the scan, to conclude that dust accumulation is causing the problems and to inform the user of the need to clean the scan paper path.

Thus, one method embodiment herein begins by sensing first document presence data of a media sheet in a media path using a scanner. Then, the method calculates a background correction factor for scanning the media sheet based on input from the scanner. Second document presence data is obtained from this background correction factor. With one embodiment, if the second document presence data indicates that no media sheet is present (which is contrary to the first document presence data), there is a possibility that the first document presence data was false. In order to check if the first document presence data is false, the method obtains third document presence data relating to alignment of the media sheet within the media path, again using the scanner. If the third document presence data also determines that no media sheet is present, this indicates that the first document presence data is false and that media path is in need of cleaning. In other words, if the first document presence data indicates that the media sheet is present, but the second document presence data and third document presence data both indicate that no media sheet is present, the method provides a notification that the media path needs cleaning.

The sensing of the first document presence data comprises detecting a leading edge of the media sheet. The calculating of the background correction factor comprises creating a histogram of a background of the media sheet. The second document presence data indicates that no media sheet is present when the histogram indicates that the background has a darkness level above a predetermined amount. The third document presence data is obtained by detecting positions of corners of the media sheet and/or media skew. The third document presence data indicates that no media sheet is present when the positions of the corners and/or the media skew are not consistent with the leading edge data. In other words, if the corner data indicates a much later start position than the leading edge indicated. This assumes that the leading edge has been determined to be "early." Not being detected at all is more often an indication of an extremely skewed document. If the first document presence data indicates that the media sheet is present and the second and third document presence data indicates that no media sheet is present, a false start of paper condition exists, and the paper path needs cleaning.

These and other features are described in, or are apparent from, the following detailed description.

BRIEF DESCRIPTION OF THE DRAWINGS

Various exemplary embodiments of the systems and methods are described in detail below, with reference to the attached drawing figures, in which.

DETAILED DESCRIPTION

Figure 1:
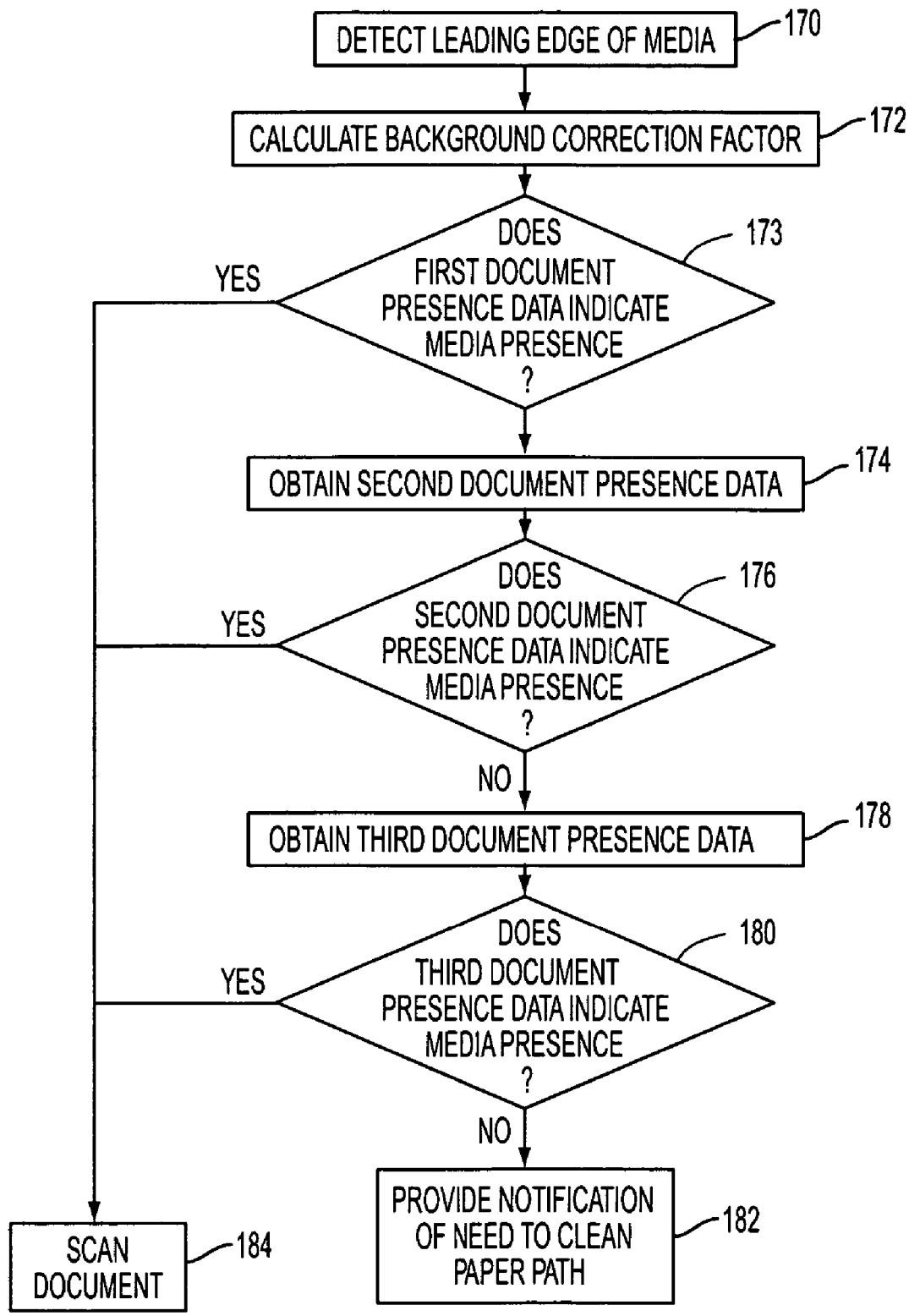
FIG. 1 is a flow diagram illustrating processing utilized by embodiments herein.

FIG. 1 is a flow diagram illustrating aspects of method embodiments disclosed herein. The embodiment shown in FIG. 1 begins when a scanner (such as the scanners 14-16, 28 discussed below) detects the leading edge of a media sheet in item 170. This leading edge is sometimes referred to herein as "first document presence data" of the media sheet in the media path. Details of means for and the process of detecting the leading edge of a sheet of media are discussed in U.S. Patent Publication 2004/0212853, the complete disclosure of which is incorporated herein by reference. More specifically, the leading edge data is the data sensed by the scanner bar representing the transition between image data of the background of the platen cover or the background of a constant velocity transport (CVT) device, and a leading edge of an input document.

Then, in item 172, the method calculates a background correction factor for scanning the media sheet based on input from the scanner. One methodology for determining a background correction factor is disclosed in U.S. Patent Publication No. 2004/0071362, the complete disclosure of which is also incorporated herein by reference. With respect to background correction, it can initially be assumed that a simple black and white text document is expected to reproduce as black characters on an otherwise white background. However, a scanned image of such a page will hardly ever have a perfectly clean (that is, a luminance value of 100) background. In general, the pixel values of the background areas will be noisy, with actual luminance values that depend on the reflectance of the paper media. Yet the desire is to produce a clean background for a wide range of media types, from low-quality newspaper to high reflectance photographic paper.

One approach to background removal is to determine the "white point" value of the page, and use this value to modify a tag in the compressed image header file. The actual background removal occurs at the back-end after decompression and merger, where the pixel values are modified through the tone reproduction curve (TRC) lookup table. Statistical data is used for extracting the white point. More sophisticated background removal algorithms may also extract additional information regarding the black point, the amount of scanner noise, and the background color. The statistical data is used in the analysis phase to extract a few enhancement parameters that control the degree of enhancement at reconstruction time. Additional image enhancement operations such as automatic real-time image enhancement or region segmentation, etc. could be applied to further enhance the image. These include automatic detection and enhancement of text or image data. For common applications such as scan, print, and copy, a full, joint 3-dimensional histogram can be used or, for example, just a 1-D histogram of the luminance channel accompanied by the dependent chrominance sums can give adequate results (see U.S. Patent Publication No. 2004/0071362).

Thus, the background correction factor is normally used to increase the quality of the image being scanned by detecting the shade (or color) of the background of the document. However, if the background correction factor detects a very dark background this may indicate that the media sheet is not actually present and that the detection of the leading edge in item 170 is actually a "false leading edge detection." Thus, if the histogram indicates a very dark background, consistent with no paper in the path, then it is used as the first evidence that a paper dust problem may exist. Alternatively, the media may just have a very dark background. Therefore, embodiments herein perform additional document presence checking before concluding that the media sheet is actually missing.

As shown in item 173, if the background correction factor is within a normal range, the first document presence data indicates a media presence, and processing proceeds to item 184 were the document is scanned and processed normally without interruption or error message. However, if the first document presence data indicates in item 173 that no media sheet is present, the method obtains "second document presence data" from this background correction factor in item 174. The presence or absence of the unusually dark background is sometimes referred to herein as the second indicator of whether the media sheet is present or "second document presence data". More specifically, the background value in the histogram is compared against a predetermined value (which can be user-defined) to evaluate whether the light level of the background is below an expected value. Thus, the embodiments herein use data from the histogram/auto background suppression module that was originally designed to detect the video value of an original in order to suppress/ lighten the background as a second means for detecting the presence of a document in item 174 to double check the leading edge detection that was performed in item 170. Since an early paper start and background detection failure can also be caused by other factors such as skew, improper default registration set-up, or defective non-volatile memory (NVM), additional data are needed to determine that the problem is indeed dust.

As shown in item 176, if the background correction factor is within a normal range, the second document presence data indicates a media presence, and processing proceeds to item 184 were the document is scanned and processed normally without interruption or error message. However, if the second document presence data indicates in item 176 that no media sheet is present (which is contrary to the first document presence data), as mentioned above, there is the possibility that the first document presence data was false.

In order to check if the first document presence data is false, the method obtains an additional indicator of whether the document is present (which is sometimes referred to herein as "third document presence data") in item 178. The third document presence data relates to alignment of the media sheet within the media path, again using the scanner. This additional third document presence data can be obtained from the lead edge registration function (i.e., top and bottom corner locations in fast scan direction, the amount of skew present in the document, calculated lead edge location, etc.), which is also collected as part of the electronic registration system. If this third data is also inconsistent with the start of paper signal from the leading edge detection, then it is concluded that dust has accumulated enough to cause the false paper detections. Thus, as shown in item 180 if the third document presence data also determines that no media sheet is present, this indicates that the media path is in need of cleaning and a notification of the need to clean the paper path is provided in item 182.

In other words, if the first document presence data indicates that the media sheet is present, but the second document presence data and third document presence data both indicate that no media sheet is present, the method provides a notification that the media path needs cleaning. The sensing of the first document presence data comprises detecting a leading edge of the media sheet. The calculating of the background correction factor comprises creating a histogram of a background of the media sheet. The second document presence data indicates that no media sheet is present when the histogram indicates that the background has a darkness level above a predetermined amount. The third document presence data is obtained by detecting positions of corners of the media sheet and/or media skew. The third document presence data indicates that no media sheet is present when the positions of the corners and/or the media skew are not consistent with the leading edge data. In other words, if the corner data indicates a much later start position than the leading edge indicated. This assumes that the leading edge has been determined to be "early." Not being detected at all is more often an indication of an extremely skewed document. If the first document presence data indicates that the media sheet is present and the second document presence data indicates that no media sheet is present, a false start of paper condition exists. Thus, with embodiments herein a message is passed to the operator instructing them to clean the paper path. Without this, a service call would be needed for a time consuming investigation to determine that auto-exposure failures resulting in unacceptable background, possible misregistration, and possible electronic black hole removal (EBHR) failure on copies are caused by scan path paper dust.

Figure 2:
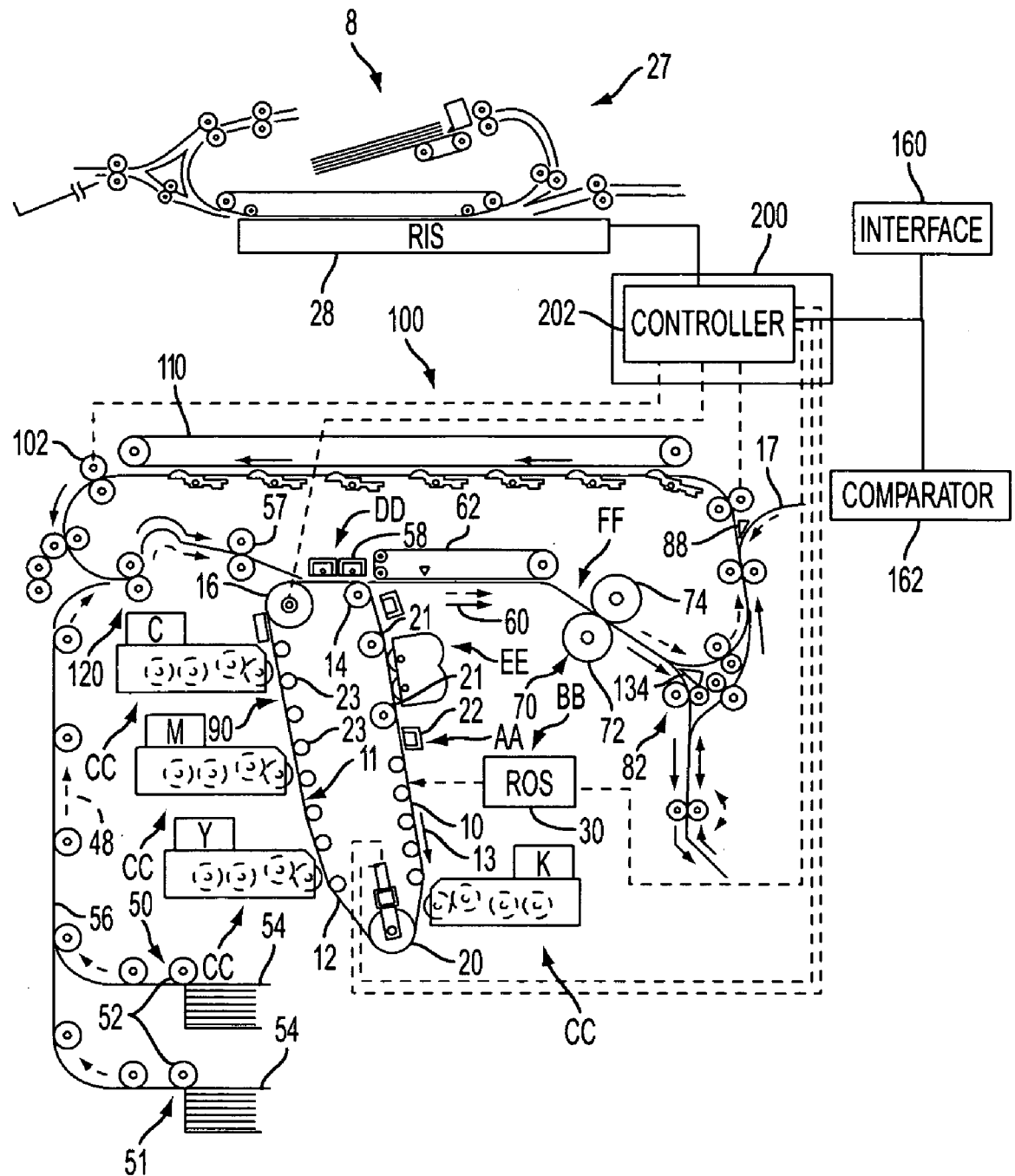
FIG. 2 is a schematic diagram of a scanning apparatus used in conjunction with a printing apparatus.

FIG. 2, schematically illustrates an apparatus embodiment in a toner image producing machine such as a copier, printer, or multifunction device shown in the form of an electrostatographic reproduction machine 8 which is sometimes referred to herein as an image outputting terminal (IOT). In the machine 8, an original document is positioned in a document handling module 27 on a raster input scanner (RIS) module indicated generally by reference numeral 28. The RIS module 28, for example, contains document illumination lamps, optics, a mechanical scanning drive and a charge coupled device (CCD) array. The RIS module 28 operates to capture the entire original document and converts it to a series of raster scan lines. This information is transmitted to a control module 200 that includes an electronic subsystem (ESS) processor 202 that controls a raster output scanner (ROS) 30.

The machine 8 generally employs a photoreceptor module 90 including a photoconductive member shown as a belt 10. The photoconductive belt 10 can be made from a photoconductive material coated on a ground layer which, in turn, is coated on an anti-curl backing layer. The belt 10 moves in the direction of arrow 13 to advance successive portions sequentially through the various processing stations disposed about the path of movement thereof. Belt 10 is entrained as a closed loop 11 about a stripping roll 14, a drive roll 16, and an idler roll 21.

Initially, a portion of the photoconductive belt surface passes through a charging station AA. At the charging station AA, a corona generating device indicated generally by the reference numeral 22 charges the photoconductive belt 10 to a relatively high, substantially uniform potential. At an exposure station BB, the controller or electronic subsystem (ESS) processor 202, receives image signals from the RIS 28 representing the desired output image and processes these signals to convert them to a continuous tone or gray scale rendition of the image which is transmitted to a modulated output generator, for example the raster output scanner (ROS), indicated generally by reference numeral 30.

The ROS 30 includes a laser with rotating polygon mirror blocks. For example, a nine-facet polygon could be used. The ROS 30 illuminates the charged portion on the surface of the photoconductive belt 10 at a resolution of about 300 or more pixels per inch. The ROS will expose the photoconductive belt 10 to record an electrostatic latent image thereon corresponding to the continuous tone image received from the ESS processor 202. As an alternative, the ROS 30 may employ a linear array of light emitting diodes (LEDs) arranged to illuminate the charged portion of the photoconductive belt 10 on a raster-by-raster basis.

After the electrostatic latent image has been recorded on the photoconductive surface 12, the belt 10 advances the latent image to a development station CC, which includes four development modules as shown each having developer units containing CMYK color toners, in the form of liquid or dry particles. As is well known, the CMYK color toners are electrostatically attracted to the latent images using commonly known techniques.

After the electrostatic latent image is developed, the toner powder image present on the belt 10 advances to the transfer station DD. A print sheet 48 is advanced to the transfer station DD, by a sheet feeding module or apparatus 50, 51. The sheet feeding apparatus 50, 51 includes a feed roll 52 contacting the uppermost sheet of the stack 54. The feed roll 52 rotates to advance the uppermost sheet from the stack 54 to the sheet transport 56. The sheet transport 56 directs the advancing sheet 48 of support material into the registration assembly 57 and then into the image transfer station DD to receive a toner image from the photoreceptor belt 10 in a timed sequence. The toner image on the image bearing surface 12 of the belt 10 contacts the advancing sheet 48 at transfer station DD. The transfer station DD includes a corona-generating device 58, which sprays ions onto the backside of sheet 48. This attracts the toner image from the photoconductive surface 12 to the sheet 48. After image transfer as such, the sheet 48 continues to move in the direction of arrow 60 by way of the belt transport 62, which advances the sheet 48 to the fusing station FF.

The fusing station FF includes a fusing module indicated generally by the reference numeral 70 which permanently affixes the transferred toner power image to the copy sheet. Preferably, the fusing module 70 includes a heated fuser roller 72 and a pressure roller 74 with the powder image on the copy sheet contacting fuser roller 72. The pressure roller is biased against the fuser roller to provide the necessary pressure to fix the toner powder image to the copy sheet. The fuser roll is internally heated by a quartz lamp (not shown). A release agent, stored in a reservoir (not shown), is pumped to a metering roll (not shown). A trim blade (not shown) trims off the excess release agent. The release agent transfers to a donor roll (not shown) and then to the fuser roll 72.

The sheet then passes through the fusing module 70 where the image is permanently fixed or fused to the sheet. After passing through the fusing module 70, a gate 88 either allows the sheet to move directly via an output 17 to a finisher or stacker, or deflects the sheet into the duplex path 100, specifically, first into a single sheet inverter 82. That is, if the second sheet is either a simplex sheet, or a completed duplexed sheet having both side one and side two images formed thereon, the sheet will be conveyed via gate 88 directly to the output finishing modules (260, 262 FIG. 2) via output path 17.

However, if the sheet is being duplexed and is then only printed with a side one image, the gate 88 will be positioned to deflect that sheet into the inverter 82 and into the duplex loop path 100, where that sheet will be inverted and then fed to the acceleration nip 102 and belt transports 110, for recirculation back through the transfer station DD and the fusing module 70 for receiving and permanently fixing the side two image to the backside of that duplex sheet, before it exits via the exit path 17.

After the print sheet is separated from the photoconductive surface 12 of the belt 10, the residual toner/developer and paper fiber particles adhering to photoconductive surface 12 are removed therefrom at a cleaning station EE. The cleaning station EE includes a rotatably mounted fibrous brush in contact with the photoconductive surface 12 to disturb and remove paper fibers and a cleaning blade to remove the non-transferred toner particles. The blade may be configured in either a wiper or doctor position depending on the application. Subsequent to cleaning, a discharge lamp (not shown) floods the photoconductive surface 12 with light to dissipate any residual electrostatic charge remaining thereon prior to the charging thereof for the next successive imaging cycle.

Figure 3:
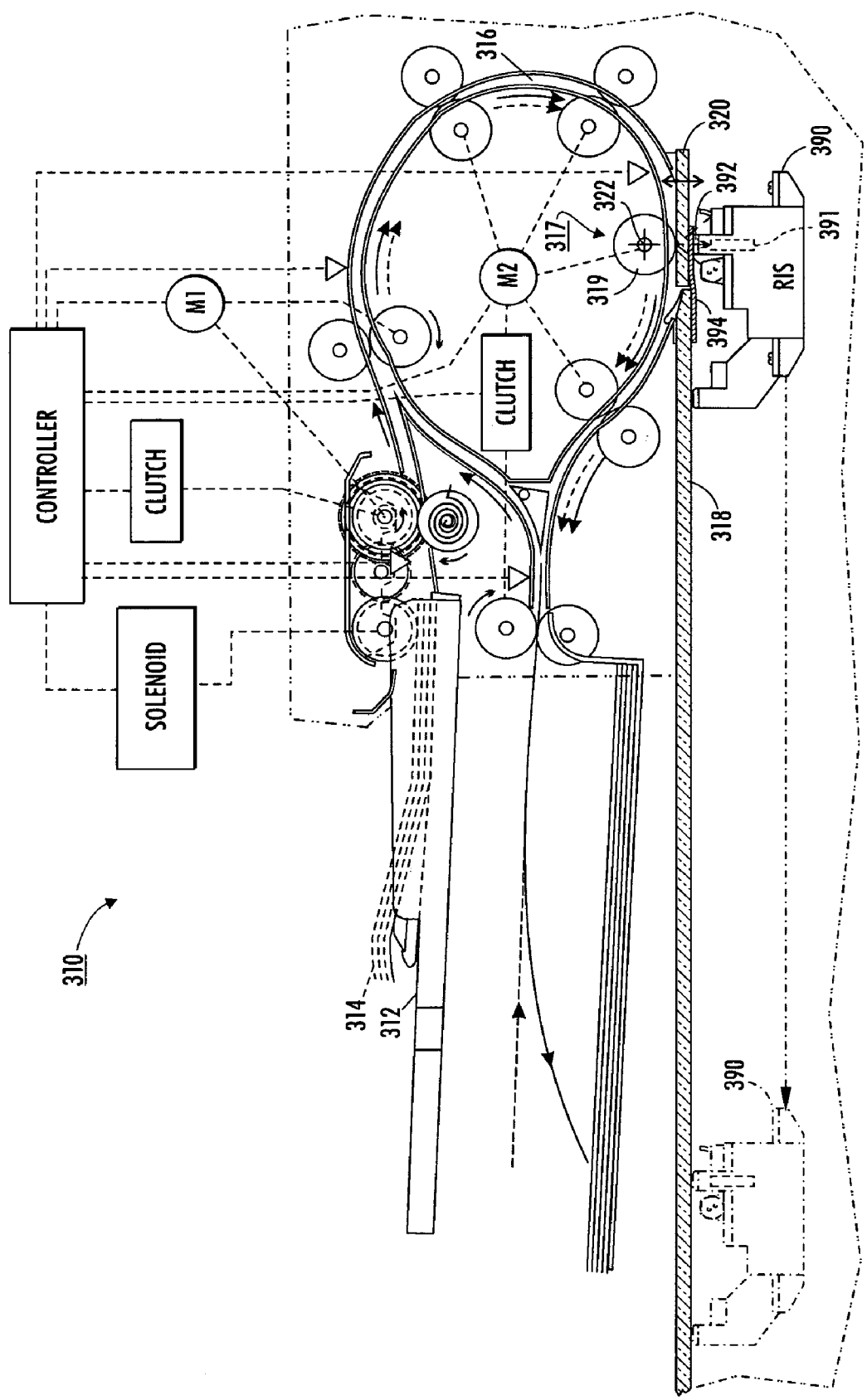
FIG. 3 is a schematic diagram of a document handler and scanner.

One more detailed example of a full width array (FWA) constant velocity transport (CVT) scanner/document handler is shown in FIG. 3, which is similar to an automatic document feeder disclosed in U.S. Pat. Nos. 5,339,139 and 6,593,995, the complete disclosures of which are incorporated herein by reference. More specifically, in FIG. 3 there is shown a dual mode document handler 310. Document sheets 314 to be imaged while moving may, as shown in FIG. 3, be automatically individually fed from a stack of sheets in an input tray 312 by a document feeder into sheet path 316 to the CVT imaging station 317, where a CVT transport roller 319 engages and feeds the sheet 314 at a constant velocity while pressing the imaged area of the sheet 314 against the upper surface of the small (narrow) transparent glass imaging platen 320 for imaging by the RIS imaging optics unit 390. The RIS is part of a known type of imaging unit 390 having slide pads 392 providing a low friction surface. The structure also includes an imager bar 391, which may be a conventionally, commercially available, full document width array of multiple CCD photosites raster input scanner (RIS). Similarly, the structure includes transitioning strips 394 of flexible and relatively low friction material to the bottom side of platens, inboard and outboard, outside of the imaging station area. These slide pads 392 are biased to maintain engagement with the bottom surface of the platen 320, to thus maintain a consistent focal distance from the upper surface of the (floating) platen 320, and hence from the document 314 being imaged.

Although a single roll 319 (or common axis plural rolls) CVT is shown, it will be appreciated that there are other known CVT systems in which there is a pair of CVT rolls spaced on opposite sides of the imaging area 317 and a floating baffle holds the document down against the platen in imaging area.

When scanning a stationary document, the large platen 318 is used. This scanning is performed by the same single optics unit 390 and its slide pads 392 moving under that other platen 318, as shown by the movement arrow and phantom line position thereof. For each return to the first mode of automatic document feeding and scanning, the optics unit 390 must then return back to its imaging station 317 position.

Thus, an apparatus embodiment comprises a scanner 28, 390 adjacent a document handler 10, 27. The scanner 28, 390 is adapted to scan media sheets as the media sheets pass through the document handler and pass by the scanner 28, 390. The processor 202 is operatively connected to the scanner 28, 390 and obtains the first, second, and third media presence data. A comparator 162 is operatively connected to or incorporated within the processor 202 and can perform the various comparisons of embodiments herein, such as those shown in FIG. 1. In addition, an interface 160 (which can comprise a graphic user interface, a network connection, etc.) is operatively connected to the comparator 162 and provides a notification of the need to clean the paper path. Thus, the interface 160 can notify the user to clean the paper path or notify the user to call for service with an on screen display message. Alternatively, the interface 160 can connect to a network that sends a message to a service center to allow a trained technician to perform the necessary cleaning.

Thus, an apparatus embodiment comprises a scanner 28, 390 adjacent a document handler 8, 312. The scanner 28, 390 is adapted to scan media sheets as the media sheets pass through the document handler and pass by the scanner 28, 390. The processor 202 is operatively connected to the scanner 28, 390. A comparator 162 is operatively connected to or incorporated within the processor 202 and can perform the comparisons needed, such as those discussed in items 176 and 180 above. In addition, an interface 160 (which can comprise a graphic user interface, a network connection, etc.) is operatively connected to the comparator 162 and/or processor 202 and provides a notification of the need to clean the paper path. The processor 202 can comprise a computer or similar device and can perform all calculations and computer program storage operations needed with embodiments herein. The word "printer" as used herein encompasses any apparatus, such as a digital copier, bookmaking machine, facsimile machine, multi-function machine, etc. which performs a print outputting function for any purpose. The details of printers, printing engines, etc. are well-known by those ordinarily skilled in the art and are discussed in, for example, U.S. Pat. No. 6,032,004, the complete disclosure of which is fully incorporated herein by reference. The following claims can encompass embodiments that print in monochrome, color or handle color image data. All foregoing embodiments are specifically applicable to electrostatographic and/or xerographic machines and/or processes.

In other words, if the first document presence data indicates that the media sheet is present, but the second document presence data and third document presence data both indicate that no media sheet is present, the method provides a notification that the media path needs cleaning. The sensing of the first document presence data comprises detecting a leading edge of the media sheet. The calculating of the background correction factor comprises creating a histogram of a background of the media sheet. The second document presence data indicates that no media sheet is present when the histogram indicates that the background has a darkness level above a predetermined amount. The third document presence data is obtained by detecting positions of corners of the media sheet and/or media skew. The third document presence data indicates that no media sheet is present when the positions of the corners and/or the media skew are not consistent with the leading edge data. In other words, if the corner data indicates a much later start position than the leading edge indicated. This assumes that the leading edge has been determined to be "early." Not being detected at all is more often an indication of an extremely skewed document. If the first document presence data indicates that the media sheet is present and the second and third document presence data indicates that no media sheet is present, a false start of paper condition exists. Thus, with embodiments herein a message is passed to the operator instructing them to clean the paper path. Without this, a service call would be needed for a time consuming investigation to determine that auto-exposure failures resulting in unacceptable background, possible misregistration, and possible electronic black hole removal (EBHR) failure on copies are caused by scan path paper dust.

It will be appreciated that the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims. The claims can encompass embodiments in hardware, software, and/or a combination thereof.

What is claimed is:

1. A computer-implemented method comprising:
   using a computer, sensing first document presence data of a media sheet in a media path wherein said sensing of said first document presence data comprises detecting a leading edge of said media sheet;
   using said computer, calculating a background correction factor for scanning said media sheet;
   using said computer, obtaining second document presence data from said background correction factor;
   using said computer to determine if said second document presence data indicates that no media sheet is present, obtaining third document presence data relating to registration of said media sheet within said media path from a lead edge registration function of an electronic registration component; and
   using said computer to determine if said first document presence data indicates that said media sheet is present, said second document presence data indicates that no media sheet is present, and said third document presence data indicates that no media sheet is present, providing a notification that said media path needs cleaning.

2. The method according to claim 1, wherein said calculating of said background correction factor comprises creating a histogram of a background of said media sheet.

3. The method according to claim 2, wherein said second document presence data indicates that no media sheet is present when said histogram indicates that said background has a darkness level above a predetermined amount.

4. The method according to claim 1, wherein said the obtaining of said third document presence data comprises detecting at least one of positions of corners of said media sheet and media skew.

5. The method according to claim 4, wherein said third document presence data indicates that no media sheet is present when said positions of said corners and said media skew cannot be determined.

6. The method according to claim 1, wherein if said first document presence data indicates that said media sheet is present and said second document presence data indicates that no media sheet is present, a false start of paper condition exists.

7. A computer-implemented method comprising:
   sensing first document presence data of a media sheet in a media path using a scanner wherein said sensing of said first document presence data of a media sheet comprises detecting a leading edge of said media sheet;
   using a computer, calculating a background correction factor for scanning said media sheet based on input from said scanner;
   using said computer, obtaining second document presence data from said background correction factor;

using said computer to determine if said second document presence data indicates that no media sheet is present, obtaining third document presence data relating to registration of said media sheet within said media path from a lead edge registration function of an electronic registration component; and using said computer to determine if said first document presence data indicates that said media sheet is present, said second document presence data indicates that no media sheet is present, and said third document presence data indicates that no media sheet is present, providing a notification that said media path needs cleaning, using said computer.

8. The method according to claim 7, wherein said calculating of said background correction factor comprises creating a histogram of a background of said media sheet.

9. The method according to claim 8, wherein said second document presence data indicates that no media sheet is present when said histogram indicates that said background has a darkness level above a predetermined amount.

10. The method according to claim 7, wherein said the obtaining of said third document presence data comprises detecting at least one of positions of corners of said media sheet and media skew.

11. The method according to claim 10, wherein said third document presence data indicates that no media sheet is present when said positions of said corners and said media skew cannot be determined.

12. The method according to claim 7, wherein if said first document presence data indicates that said media sheet is present and said second document presence data indicates that no media sheet is present, a false start of paper condition exists.

13. A computer-implemented method comprising:

using a computer, sensing a leading edge of a media sheet in a media path wherein said sensing of said first document presence data comprises detecting a leading edge of said media sheet;

using said computer, calculating a background correction factor for scanning said media sheet;

using said computer, determining whether said media sheet is present based on said background correction factor;

using said computer to determine if said background correction factor indicates that no media sheet is present, obtaining additional document presence data relating to registration of said media sheet within said media path from a lead edge registration function of an electronic registration component; and using said computer to determine if said leading edge indicates that said media sheet is present, said background correction factor indicates that no media sheet is present, and said additional document presence data indicates that no media sheet is present, providing a notification that said media path needs cleaning.

14. The method according to claim 13, wherein said calculating of said background correction factor comprises creating a histogram of a background of said media sheet.

15. The method according to claim 14, wherein said background correction factor indicates that no media sheet is present when said histogram indicates that said background has a darkness level above a predetermined amount.

16. The method according to claim 13, wherein said the obtaining of said additional document presence data comprises detecting at least one of positions of corners of said media sheet and media skew.

17. The method according to claim 16, wherein said additional document presence data indicates that no media sheet is present when said positions of said corners and said media skew cannot be determined.

18. A computer program product comprising:

a computer-usable data carrier storing instructions that, when executed by a computer, cause the computer to perform a method comprising:

sensing first document presence data of a media sheet in a media path;

calculating a background correction factor for scanning said media sheet;

obtaining second document presence data from said background correction factor;

if said second document presence data indicates that no media sheet is present, obtaining third document presence data relating to registration of said media sheet within said media path from a lead edge registration function of an electronic registration component; and if said first document presence data indicates that said media sheet is present, said second document presence data indicates that no media sheet is present, and said third document presence data indicates that no media sheet is present, providing a notification that said media path needs cleaning.

* * * * *